United States Patent [19]

Kissel et al.

[11] Patent Number: 4,719,573
[45] Date of Patent: Jan. 12, 1988

[54] PROGRAMMED SPARK SCATTER CONTROL METHOD FOR QUICK RESPONSE TO CHANGING LOAD CONDITIONS

[75] Inventors: William R. Kissel, Milford; Michael F. Michel, Livonia; Thomas Glowczewski, Washington Twp., Macomb County; Douglas C. Frantz, Berkley, all of Mich.

[73] Assignee: Chrysler Motors Corporation, Highland Park, Mich.

[21] Appl. No.: 882,440

[22] Filed: Jul. 7, 1986

Related U.S. Application Data

[63] Continuation of Ser. No. 620,228, Jun. 13, 1984, abandoned.

[51] Int. Cl.⁴ .............................. F02B 3/04; F02P 5/04
[52] U.S. Cl. .................................. 364/431.07; 123/417; 364/431.05
[58] Field of Search ..................... 364/431.07, 431.05, 364/431.10; 123/339, 417, 418

[56] References Cited

U.S. PATENT DOCUMENTS

| | | | |
|---|---|---|---|
| 4,240,145 | 12/1980 | Yano et al. | 364/431.07 |
| 4,245,591 | 1/1981 | Nishida et al. | 123/418 |
| 4,344,399 | 8/1982 | Matsumura et al. | 364/431.07 |
| 4,377,996 | 3/1983 | Yamaguchi | 123/417 |
| 4,424,568 | 1/1984 | Nishimura et al. | 364/431.07 |
| 4,426,973 | 1/1984 | Nakano et al. | 123/417 |
| 4,495,579 | 1/1985 | Fukushima et al. | 364/431.07 |
| 4,506,639 | 3/1985 | Murakami et al. | 123/339 |
| 4,509,477 | 4/1985 | Takao et al. | 123/339 |

Primary Examiner—Parshotam S. Lall
Attorney, Agent, or Firm—Mark P. Calcaterra

[57] ABSTRACT

In an idle speed control system for an engine equipped with a fuel/air mixture means and an air bypass means or movable throttle stop means, the idle speed can be quickly moved to the desired value by temporarily changing the spark advance and holding the changed spark advance until the air bypass system or movable throttle stop means has had a chance to respond to the various demands of the idle condition.

4 Claims, 1 Drawing Figure

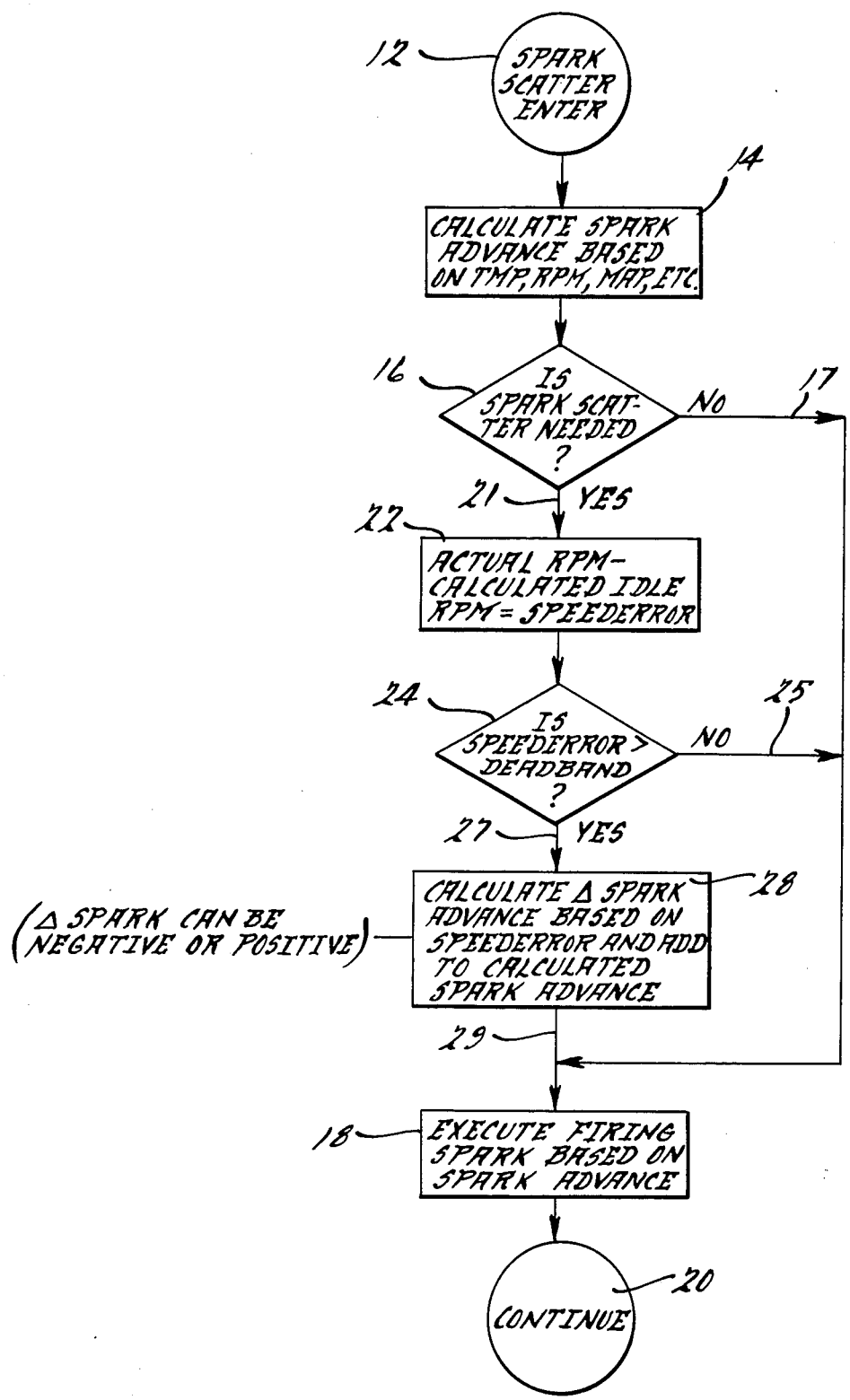

PROGRAMMED SPARK SCATTER CONTROL METHOD FOR QUICK RESPONSE TO CHANGING LOAD CONDITIONS

This is a continuation application of U.S. patent application Ser. No. 620,228, filed June 13, 1984, now abandoned.

BACKGROUND AND SUMMARY OF THE INVENTION

Most conventional idle speed control systems involve servo-control of engine airflow either with a movable throttle stop or with an air bypass valve. There is a relatively long delay between any change in airflow and the corresponding change in idle speed. Therefore, the controller must have a fairly high degree of damping to maintain stability, and the response of the system to changing load conditions is rather slow.

Particularly with low idle speeds, desirable for low fuel consumption, there is a danger of the engine stalling with the sudden application of a load or combination of loads, such as the air conditioning compressor, power steering or alternator.

In these systems, if an attempt is made to speed up response by reducing the damping, over-shooting and oscillations in engine speed may occur. These conditions are objectionable by themselves, and may also result in stalling.

In addition, if the airflow is increased too suddenly, delays in fuel response and intake manifold fuel accumulation effects may cause transient disturbances in the fuel air ratio which can aggrevate the stability problem.

By temporarily changing the spark advance in response to idle speed changes due to changing engine load, either by retarding or advancing the value, the idle speed can be quickly moved back to the targeted value and held there until the air bypass system has a chance to catch up. As the air bypass valve is properly positioned, the spark advance is slowly changed back to its steady state value. This strategy allows the automatic idle speed actuator valve or motor to operate in such a manner that the system is very stable without the undesirable effects of slow response.

Although particularly well suited for control in an air bypass system, such a method can also be used in conventional carbureted engines and in throttle body injected engines and in multipoint fuel injected engines, all with movable throttle stops to control the spark advance in the same manner as herein described.

DESCRIPTION OF THE DRAWINGS

Other objects, features and advantages of the present invention will become more fully apparent from the following detailed description of the preferred embodiment, the appended claims and the accompanying drawing in which:

The FIGURE is a flow chart illustrating each of the components and steps to the idle speed control system described herein.

DETAILED DESCRIPTION OF THE PREFERRED EMBODIMENT

This disclosure assumes the use of a computational device such as a microprocessor and assumes that the device interfaces with several transducers which monitor various engine parameters such as the engine temperature (TMP), engine revolutions per minute (RPM), engine manifold absolute pressure (MAP), etc. This disclosure further relies upon the use of a monitoring method within the computational control means which provides for the evaluation and revision of the spark advance settings at a pre-determined time interval. It is also to be assumed that the spark advance values may require revision more often than the computational device is programmed to evaluate it. Therefore, it is also assumed that the method of spark advance control described herein can be approached on an interrupt basis, as well as during the normal monitoring intervals of the computational control system.

Referring to the FIGURE, once it is determined that the spark advance needs updating, (this could be due to a periodic checkup of the spark advance or due to a demand for revised spark advance; this threshold decision is shown in bubble number 12 on the Figure) the desired spark advance is calculated in block 14 based on parameters provided by transducers which monitor engine temperature, engine RPM, engine MAP, etc. This value of desired spark advance is then stored for further use.

A determination is now made in block 16 as to whether to employ the spark scatter method or whether to jump to block 18 to execute the spark firing based on the calculated spark advance. The decision in block 16 is made, for example in an air bypass system by determining whether the throttle is closed, whether the RPM is less than a specified value, whether the vehicle is in gear, etc. For systems not employing an air bypass port, the decision in block 16 is less complicated.

If spark scatter is not needed, the control system branches to block 18 via path 17 in the Figure to execute the firing of the spark based on the calculated spark advance from block 14. At this point, the control system returns to its other tasks in block 20.

Returning now to block 16, if spark scatter is needed, the control system begins to calculate a speed error via path 21. The speed error is calculated in block 22 and is equal to the difference between the actual RPM of the engine and a calculated idle RPM value which has been stored in the computational control device.

Once the speed error has been calculated, the control system then moves to block 24 and compares the speed error signal with an envelope or dead band of acceptable speed error signals. If the speed error is inside the envelope, the control system branches to block 18 via path 25 to again execute the firing of the spark based on the previously calculated spark advance from block 14.

Returning now to block 24, if the speed error signal is outside of the dead band or envelope of acceptable values, the control system moves to calculate a revised spark advance value in block 28 via path 27. The revised spark advance value is composed of a delta spark advance which is calculated based on the speed error deviation from the envelope or dead band of acceptable values. As such, the delta spark advance value can be negative or positive. The delta spark advance is then added to the calculated spark advance signal from block 14.

The control system now falls through to block 18 via path 29 and executes the firing of the spark based on the revised spark advance value from block 28.

At this point, the control system returns to the rest of its tasks via block 20 and waits for re-entry into the spark scatter routine at block 12 based on the next schedule monitoring time or based on an interrupt.

While the present invention has been disclosed in connection with the preferred embodiment thereof, it should be understood that there may be other embodiments which fall within the spirit and scope of the invention and that the invention is susceptible to modification, variation and change without departing from the proper scope or fair meaning of the following claims.

What is claimed is:

1. In a vehicle having an engine with fuel and air mixture means, a method of spark advance control having computation means and means for monitoring and storing various engine parameters such as engine temperature, engine revolutions per minute (RPM), and engine manifold absolute pressure (MAP) and means for firing the spark to the appropriate cylinder comprising:

deriving a desired spark advance setting based on the various engine parameters;

determining whether to execute the spark firing based on the derived spark advance setting;

computing a delta spark advance and revising the derived spark advance setting if it is determined not to execute the spark firing based on the derived spark advance setting; and firing the spark to the appropriate engine cylinder based on either of the derived spark advance setting and revised derived spark advance setting;

said step of computing a delta spark advance and revising the derived spark advance setting comprising:

computing a speed error setting by subtracting a calculated ideal engine idle RPM from the actual engine RPM;

comparing the computed speed error setting with a deadband envelope of previously determined speed error settings;

firing the spark to the appropriate engine cylinder based on the derived spark advance setting if the speed error signal is within the deadband envelope;

deriving a delta spark advance based on the computed speed error setting if the computed speed error setting is outside the deadband envelope and adding the delta spark advance to the derived spark advance setting;

firing the spark to the appropriate engine cylinder based on the revised derived spark advance setting if the speed error signal is outside the deadband envelope.

2. The method of spark advance control described in claim 1 including the step of returning the spark advance setting to a steady state value prior to updating the derived spark advance setting.

3. In a vehicle having an engine with fuel and air mixture means, a method for idle speed control having computation means and means for monitoring and storing various engine parameters such as engine temperature, engine revolutions per minute (RPM), and engine manifold absolute pressure (MAP) and means for fitting the spark to the appropriate engine cylinder comprising:

deriving a desired spark advance setting based on the various engine parameters;

determining when the engine is at an idle condition;

firing the spark to the appropriate cylinder if the engine is not at idle;

computing a delta spark advance and revising the previous spark advance with the delta spark advance if the engine is at idle;

firing the spark to the appropriate engine cylinder with the revised spark advance if the spark advance does need updating based on engine parameters;

said step of computing a delta spark advance and revising the previous spark advance comprising:

computing a speed error setting by subtracting a calculated ideal engine idle RPM from the actual engine RPM;

comparing the computed speed error setting with a deadband envelope of previously determined speed error settings;

firing the spark to the appropriate engine cylinder based on the derived spark advance setting if the speed error signal is within the deadband envelope;

deriving a delta spark advance based on the computed speed error setting if the computed speed error setting is outside the deadband envelope and adding the delta spark advance to the previously derived spark advance setting; and firing the spark to the appropriate engine cylinder based on the revised spark advance setting if the speed error signal is outside the deadband envelope.

4. The method of idle speed control described in claim 3 including the step of returning the spark advance setting to a steady state value prior to updating the derived spark advance setting.

* * * * *